United States Patent [19]

deKlerk

[11] 3,825,779

[45] July 23, 1974

[54] INTERDIGITAL MOSAIC THIN FILM SHEAR TRANSDUCER

[75] Inventor: John deKlerk, Pittsburgh, Pa.

[73] Assignee: Westinghouse Electric Corporation, Pittsburgh, Pa.

[22] Filed: Mar. 30, 1973

[21] Appl. No.: 346,547

[52] U.S. Cl. .................. 310/9.8, 333/30 R

[51] Int. Cl. .................. H04r 17/00

[58] Field of Search ......... 310/8.1, 9.7, 9.8; 333/30, 333/70, 72

[56] References Cited

UNITED STATES PATENTS

| | | | |
|---|---|---|---|
| 3,582,839 | 6/1971 | Pim et al. | 310/9.8 X |
| 3,587,005 | 6/1971 | Fair | 310/8.1 X |
| 3,688,222 | 8/1972 | Liberman | 310/9.7 X |
| 3,689,784 | 9/1972 | deKlerk | 310/9.8 |

*Primary Examiner*—J. D. Miller
*Assistant Examiner*—Mark O. Budd
*Attorney, Agent, or Firm*—C. L. O'Rourke

[57] ABSTRACT

An interdigital shear transducer which includes a substrate to which a first pair of first and second electrode arrays is deposited. Each array includes *n* metalized conductive pads and a pair of electrodes for each pad. Except for the first and last pads of the first and second arrays, respectively, one electrode of each pair is common to a corresponding but adjacent pad of an opposite array. The first and last pad electrodes are independent. All electrodes are interdigitated between electrodes of an opposite array. A piezoelectric film is deposited over the electrodes of the first pair and the substrate. A second pair of identical first and second arrays is deposited so as to have conductive pads in common with the first pair and electrodes deposited on the film over like electrodes of the first pair.

2 Claims, 3 Drawing Figures

INTERDIGITAL MOSAIC THIN FILM SHEAR TRANSDUCER

FIELD OF THE INVENTION

The present invention relates to an improved interdigital mosaic thin-film shear transducer.

BACKGROUND OF THE INVENTION

While known for nearly a century, elastic surface waves have only recently been found to have practical utility, particularly in microwave signal processing. Because elastic surface waves propagate at a velocity of approximately $10^5$ times slower than electromagnetic waves, the elastic waves have proportionately shorter wavelength thereby facilitating substantially smaller devices than electromagnetic counterparts.

Of the known types of surface waves, the Rayleigh wave has been the most frequent as well as extensively studied wave. Rayleigh waves are elastic surface waves on a free surface bounded by a vacuum or a gas with a retrograde eliptical particle motion at the surface. The retrograde eliptical particle motion is resolvable into a shear component with displacements normal to the surface and energy flow along the wave normal and a compressional component with displacement and energy flow along the wave normal. The energy in a pure Rayleigh wave is entirely confined to a very thin layer below the surface, that is, in a layer generally not more than two wavelengths in thickness.

In microwave acoustic delay line devices and similar applications, it is frequently desirable to utilize the shear waves rather than the compressional waves because the shear wave velocity is about one-half the velocity of the compressional material in the same material. Accordingly, a device such as a delay line utilizing shear waves can be made approximately one-half the length of a device utilizing compressional waves for the same delay time. The ability to save space is particularly critical in microminiature acoustical circuits similar to electronic integrated circuits, and it is therefore desirable to have a transducer capable of generating pure shear waves.

In crystallized piezoelectric films of the hexagonal form of 6 mm class, II-VI compounds, there is complete rotational symmetry about the c-axis for elastic, dielectric, and piezoelectric properties. Orientation about the c-axis is, therefore, descriptive of the crystal. For a film in which the c-axis is normal to a substrate, such as a delay line, and parallel to an electric field, a compressional wave can be generated and launched into the substrate medium. On the other hand, the film in which the c-axis is in the film plane, a shear ultrasonic wave polarized in the direction of the c-axis can be propagated in the substrate, and for a film in which the c-axis lies in an intermediate angle, both types of waves can be in general propagated into the substrate.

It is known that where the c-axis is inclined at an angle of about 38.5° to the normal the shear coupling is relatively large while the compressional coupling is 0 (2 Electronics Letters 213 (1966)). Thus in thin films of the 6 mm class, the conventional method of fabricating a shear wave transducer has been to grow the piezoelectric film in such a way that the c-axis is approximately at a 40° angle to the film normal (38 J. App. Phys. 149 (1967)).

In CdS films, for example, this is achieved by deposition from a CdS molecular beam surface tilted to about 40° from the vapor beam. Utilization of this method, however, restricts the operable frequency ranges to values below about 400 MHz as the c-axis gradually tilts away from the normal. It is only after the film has been grown to a thickness between 3,000 to 4,000 A does the 40° c-axis orientation occur. Attempts have been made to overcome this problem by depositing highly conductive CdS as the initial layer required to tilt the c-axis to 40°. As a practical matter transducers produced by these methods generate both shear and compressional waves rather than pure shear waves. Moreover, these transducers result in low impedance and high capacitance which requires electrical input matching networks.

A novel broad band, high frequency thin-film piezoelectric transducer has been developed which is capable of matching the impedance of a transmission line, U.S. Pat. No. 3,689,784, assigned to the assignee of the present invention. The transducer disclosed therein is directed primarily to the generation of compressional waves; however, shear wave production is also possible therewith.

Accordingly, it is an object of the present invention to provide an interdigital mosaic thin-film shear transducer which comprises an improvement upon the transducer disclosed in U.S. Pat. No. 3,689,784.

SUMMARY OF THE INVENTION

The present invention provides an improved interdigital mosaic thin-film shear transducer for obtaining high impedance and low capacitance. Generally, the transducer of the present invention comprises a first and second pair of first and second arrays of n metalized conductive pads. The number of metalized pads is greater than two and preferably greater than 10. The first pad of the first array and the last pad of the second array are adapted to receive an electrical input of opposing polarity and include a pair of parallel elongated electrodes. All of the other conductive pads include an elongated electrode and a common electrode. The elongated electrodes are substantially the same as those of first and last pads of the first and second arrays, respectively. The common electrodes extend between adjacent corresponding conductive pads of the first and second array; that is, the common electrodes are coextensive between pads $n$-($n$-2,3 . . . $n$) and $n$-($n$-1,2 . . . ($n$-1)) of the first and second arrays. All of the electrodes are spaced between electrodes from an opposite array. Preferably, all of the electrodes are parallel.

The conductive pads of each of the arrays is mounted to a substrate, such as an acoustic delay line. A piezoelectric film is deposited over the electrodes and in contact with the substrate. The second pair of first and second arrays of conductive electrodes corresponding to the first pair is deposited over the piezoelectric film to overlie the electrodes of the first pair. The second pair of first and second array electrodes deposited on the piezoelectric film preferably utilizes the conductive pads of the first array.

The size of the electrodes and conductive pads are preferably sufficiently large to utilize a shadow masking technique to vapor deposit the metal elements, e.g. gold. The gap between the electrodes is large compared to the thickness of the piezoelectric film to assure only lateral electric fields propagating therethrough and thus pure shear waves.

Impedance is selectable by properly choosing the number of interdigital electrodes. By selecting the length of each of the electrodes, various capacitive values can be assumed. Generally, the shorter the electrode, the lower its capacitance.

The resonant frequency of the shear wave transducer of the present invention is determined by the thickness of the piezoelectric film. The direction of shear particle displacement is normal to the longitudinal axis of the interdigital electrodes. Thus, by selecting the orientation of the electrodes with respect to the substrate crystal axis, either of the two shear velocities of the substrate can be achieved or both modes launched simultaneously.

Other advantages of the invention will become apparent from a perusal of the description of a presently preferred embodiment taken in connection with the accompanying drawings.

PRESENTLY PREFERRED EMBODIMENT

Figure 1:
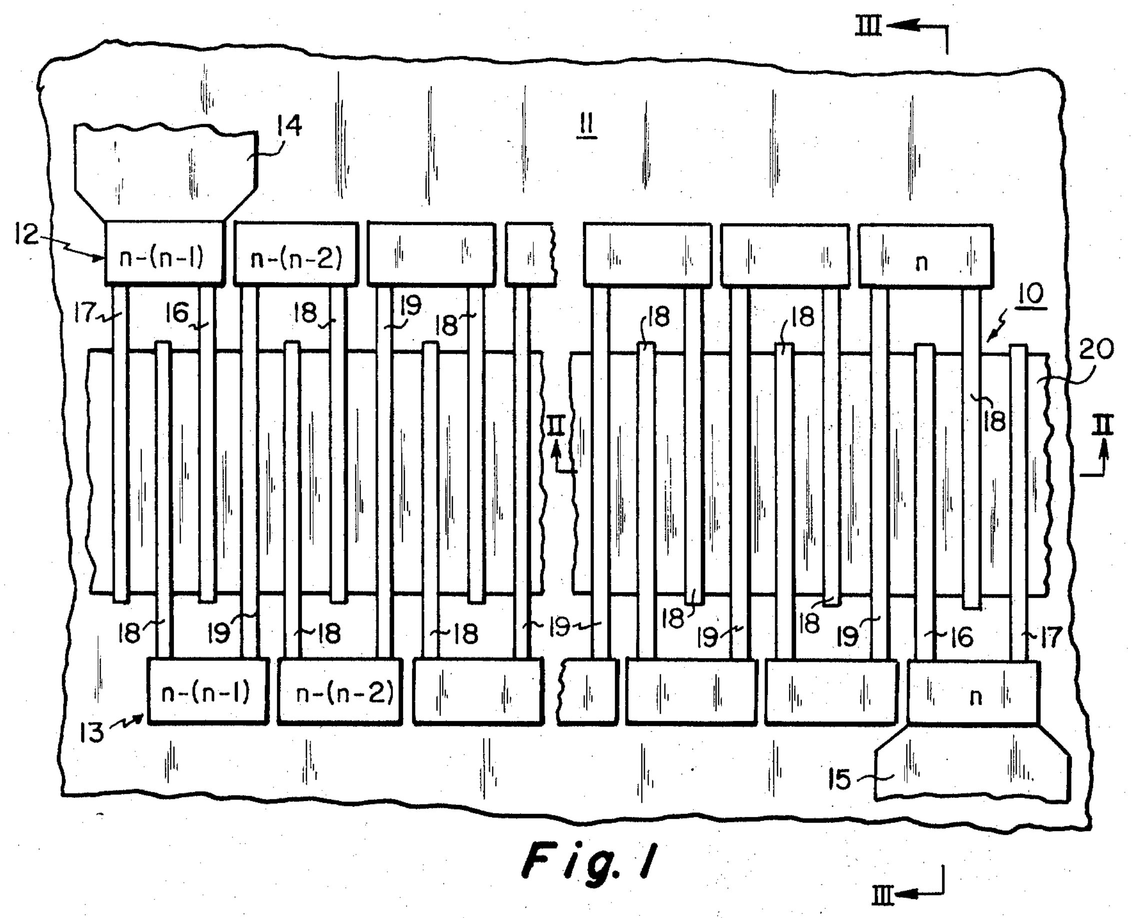
FIG. 1 is a plan view of an interdigital mosaic thin-film shear transducer according to the present invention.
Figure 2:
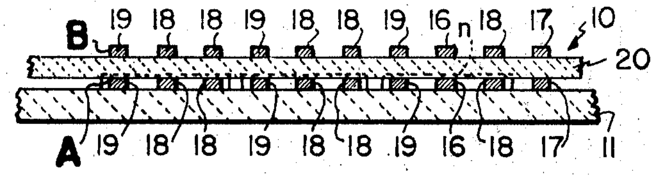
FIG. 2 is a section of the transducer taken along line II—II of FIG. 1.
Figure 3:
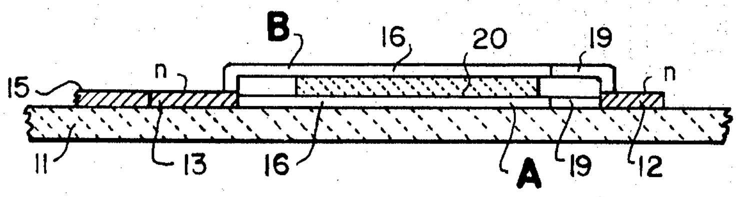
FIG. 3 is a section of the transducer taken along the line III—III of FIG. 1.

Referring to FIGS. 1, 2 and 3, interdigital shear transducer 10 of the present invention is mounted on substrate 11, for example, a delay line of $Al_2O_3$ through which the shear components of the Rayleigh waves are propagated. Transducer 10 comprises a first and second pair, A and B, of first and second electrode arrays 12 and 13, respectively. Each electrode array 12 and 13 of first pair A comprises from two to n metalized conductive pads. The first conductive pad, $n$-($n$-1), of first array 12 and the last conductive pad, n, of second array 13 include electrical input means 14 and 15, respectively, for receiving an electrical input signal of opposing polarity. First and last conductive pads $n$-($n$-1) and n include a pair of elongated electrodes 16 and 17 which are spaced apart and parallel to each other. All of the other conductive pads $n$-($n$-2,3 . . . $n$) of the first array 12 and $n$-($n$-1,2 . . . ($n$-1)) of second array 13 include an elongated electrode 18 and common electrodes 19. Common electrodes 19 are coextensive between adjacent corresponding pads of the opposite array. That is, common electrodes 19 extend between pads $n$-($n$-2,3 . . . $n$) of the first array 12 and $n$-($n$-1,2 . . . ( $n$-1)) of second array 13. All of the elongated electrodes 16, 17 and 18 are spaced between electrodes, including common electrodes 19 from an opposite array.

Conductive pads for first pair A of arrays 12 and 13 and the corresponding electrodes are deposited on substrate 11. Piezoelectric film 20 is deposited over electrodes 16–19 of pair A. Piezoelectric film 20 is preferably ZnO, although other II–VI compounds of the 6 mm class are suitable. Second pair B or array 12 and 13 is deposited over film 20. Preferably electrodes 16–19 of the second pair B are deposited on the surface of piezoelectric film 20 and are connected to the associated conductive pads of first pair A as shown in FIG. 3. It is necessary that the electrodes of second pair B deposited on the surface of film 20 lie directly over the corresponding electrodes of first pair A on the substrate so that no vertical electric field components are generated. While it is possible to provide second pair B of first and second arrays with separate conductive pads, no advantage is achieved thereby. Accordingly, it is preferred that the conductive pads of first pair A serve both pairs of electrodes.

The interdigital transducer of the present invention can be fabricated by techniques well known in the art. For example, the conductive pads of first and second arrays 12 and 13 and the associate electrodes are formed by evaporating gold or other suitable metal by a shadow mask technique. Piezoelectric material such as cadmium sulfide or, preferably zinc oxide, is evaporatively deposited through an aperture mask. An illustrative configuration would include a transducer such as shown in FIG. 1 having an overall length of 154 mils. The length of electrodes 16–18 is 76 mils, and the length of each of common electrodes 19 is 96 mils. Where the width of each electrode 16–19 is 1 mil, the space between each of the electrodes is approximately 2 mils. The total number of electrodes in each pair is 52. In such an arrangement, $n = 17$ for each of the pairs of first and second arrays. The pads of the first array each have a rectangular shape of 7 × 10 mils and each is separated by a distance of 2 mils. A mask having a window 166 mils by 66 mils would be utilized for depositing a zinc oxide piezoelectric film.

While presently preferred embodiments of the invention have been shown and described in particularity, it may otherwise be embodied within the scope of the appended claims.

What is claimed is:

1. An interdigital mosaic thin-film shear transducer comprising a substrate; a first pair of arrays positioned on said substrate, said first pair consisting of a first and a second spaced apart array, each array including from two to n metalized conductive pads, the $n$-($n$-1)$^{th}$ pad of said first array and the nth pad of said second array being adapted to receive an electrical input of opposite polarity and each of said pads including two spaced apart substantially parallel elongated electrodes; said other pads each having an elongated electrode and a common electrode, said common electrodes each being coextensive between an associated $n$-($n$-2,3 . . . $n$) pad of said first array and an $n$-($n$-1,2 . . . ($n$-1)) pad of said second array, each of said common electrodes being spaced between and parallel to an elongated electrode from an adjacent pad of the same array and an elongated electrode of a corresponding pad of said other array; a piezoelectric film positioned over and in contact with the electrodes of said first and second array of said first pair and said substrate; and a second pair of arrays, said second pair consisting pf first and second arrays, said first array having $n$ metal conductive pads in common with the pads of said first array of said first pair and said second array having $n$ metalized conductive pads in common with the pads of said second array of said first pair, each pad of said first and second arrays of said second pair having a pair of electrodes positioned on said piezoelectric film that overlie and are identical to the electrodes of the common pad of said first and second arrays of said first pair.

2. A shear transducer as set forth in claim 1 wherein the space between said electrodes is at least 100 times greater than the thickness of said film.

* * * * *